US005804752A

United States Patent [19]

Sone et al.

[11] Patent Number: 5,804,752

[45] Date of Patent: Sep. 8, 1998

[54] KARAOKE APPARATUS WITH INDIVIDUAL SCORING OF DUET SINGERS

[75] Inventors: Takuro Sone; Kanehisa Tsurumi; Hirokazu Kato; Takahiro Tanaka, all of Hamamatsu, Japan

[73] Assignee: Yamaha Corporation, Hamamatsu, Japan

[21] Appl. No.: 918,326

[22] Filed: Aug. 26, 1997

[30] Foreign Application Priority Data

Aug. 30, 1996 [JP] Japan .................................... 8-230577

[51] Int. Cl.[6] .............................. G09B 15/02; G10H 1/36

[52] U.S. Cl. ............................ 84/610; 84/634; 84/477 R; 364/551.01; 369/53; 434/307 A

[58] Field of Search ..................... 84/609–614, 634–638, 84/477 R, 478; 364/551.01; 369/53; 434/307 A

[56] References Cited

U.S. PATENT DOCUMENTS

| | | | |
|---|---|---|---|
| 4,546,687 | 10/1985 | Minami | 84/477 R X |
| 5,395,123 | 3/1995 | Kondo | 434/307 A X |
| 5,434,949 | 7/1995 | Jeong | 84/477 R X |
| 5,511,053 | 4/1996 | Jae-Chang | 84/612 X |
| 5,525,062 | 6/1996 | Ogawa et al. | 434/307 A |
| 5,557,056 | 9/1996 | Hong et al. | 84/610 |
| 5,565,639 | 10/1996 | Bae | 84/477 R |
| 5,567,162 | 10/1996 | Park | 434/307 A |
| 5,715,179 | 2/1998 | Park | 84/609 X |
| 5,719,344 | 2/1998 | Pawate | 84/609 |

*Primary Examiner*—Stanley J. Witkowski
*Attorney, Agent, or Firm*—Pillsbury Madison & Sutro LLP

[57] ABSTRACT

The karaoke apparatus is constructed for accompanying a karaoke music on a singer according to music information. In the karaoke apparatus, a providing device provides the music information containing accompaniment data and at least first reference data and second reference data, respectively, corresponding to a first part and a second part of the karaoke music. A generating device generates the karaoke music according to the accompaniment data while a first singer sings the first part along with the karaoke music and a second singer sings the second part along with the karaoke music. A collecting device collects a first singing voice of the first singer and a second singing voice of the second singer during progression of the karaoke music. An extracting device extracts from the collected first singing voice a first music property characteristic to a singing skill of the first singer, and separately extracts from the second singing voice a second music property characteristic to a singing skill of the second singer. A scoring device compares the first music property with the first reference data to evaluate the singing skill of the first singer, and compares the second music property with the second reference data to evaluate the singing skill of the second singer so that the singing skill of the first singer and the singing skill of the second singer can be scored individually and independently from one another while the first singing voice and the second singing voice are mixed to each other.

21 Claims, 13 Drawing Sheets

KARAOKE APPARATUS WITH INDIVIDUAL SCORING OF DUET SINGERS

BACKGROUND OF THE INVENTION

The present invention relates to a karaoke apparatus having a capability of scoring the singing skill of a singer.

A variety of karaoke apparatuses having a capability of scoring the singing skill of a singer have been developed. Generally, in these conventional karaoke apparatuses, a singing voice of a singer is compared in volume and pitch with reference data of a vocal part included in karaoke music information. The singing skill of the singer is scored based on the degree of matching between the singing voice and the reference data in terms of volume and pitch.

In some conventional karaoke apparatuses, a piece of music such as a duet song made up of a plurality of vocal parts is sung by a pair of singers. In this case, a composite signal resulted from mixing of singing voices inputted from a plurality of microphones is compared with the reference data. Normally, reference data of a main vocal part is used to score the singing skill of the duet singers. Consequently, the singing voices of the duet singers cannot be evaluated individually and separately from each other, thereby failing to provide correct scoring results.

SUMMARY OF THE INVENTION

It is therefore an object of the present invention to provide a karaoke apparatus operable when a plurality of vocal parts are concurrently sung in a duet song or else for correctly evaluating singing voices of the duet singers individually and separately from each other.

According to the invention, a karaoke apparatus is constructed for accompanying a karaoke music on a singer according to music information. The karaoke apparatus comprises a providing device that provides the music information containing accompaniment data and at least first reference data and second reference data, respectively, corresponding to a first part and a second part of the karaoke music, a generating device that generates the karaoke music according to the accompaniment data while a first singer sings the first part along with the karaoke music and a second singer sings the second part along with the karaoke music, a collecting device that collects a first singing voice of the first singer and a second singing voice of the second singer during progression of the karaoke music, an extracting device that extracts from the collected first singing voice a first music property characteristic to a singing skill of the first singer, and that separately extracts from the second singing voice a second music property characteristic to a singing skill of the second singer, and a scoring device that compares the first music property with the first reference data to evaluate the singing skill of the first singer, and that compares the second music property with the second reference data to evaluate the singing skill of the second singer so that the singing skill of the first singer and the singing skill of the second singer can be scored individually and independently from one another while the first singing voice and the second singing voice are mixed to each other.

Preferably, the providing device provides the music information of a duet karaoke music such that the first part is assigned to a main vocal part and the second part is assigned to a chorus vocal part, and the scoring device evaluates the singing skill of the first singer who sings the main vocal part and evaluates the singing skill of the second singer who sings the chorus vocal part jointly with the first singer.

Preferably, the extracting device extracts the first music property in terms of at least one of pitch, volume and rhythm of the first singing voice, and separately extracts the second music property in terms of at least one of pitch, volume and rhythm of the second singing voice. Practically, the extracting device extracts the first music property in terms of all of pitch, volume and rhythm of the first singing voice, and separately extracts the second music property in terms of all of pitch, volume and rhythm of the second singing voice. In such a case, the extracting device secondarily extracts the rhythm of the first singing voice according to variation of the volume which is primarily extracted from the first singing voice, and secondarily extracts the rhythm of the second singing voice according to variation of the volume which is primarily extracted from the second singing voice.

Preferably, the providing device provides the first reference data based on a first guide melody contained in the karaoke music to guide the first part, and provides the second reference data based on a second guide melody contained in the karaoke music to guide the second part.

Preferably, the extracting device successively extracts samples of the first music property and samples of the second music property during the progression of the karaoke music, and the scoring device successively calculates a difference between each sample of the first music property and the first reference data and accumulates the calculated difference to obtain a first score point representative of the singing skill of the first singer, and successively calculates a difference between each sample of the second music property and the second reference data and accumulates the calculated difference to obtain a second score point representative of the singing skill of the second singer. If desired, the scoring device includes an averaging device that averages the first score point and the second score point so as to evaluate a total singing skill of the first singer and the second singer.

DETAILED DESCRIPTION OF PREFERRED EMBODIMENTS

This invention will be described in further detail by way of preferred embodiments with reference to the accompanying drawings.

Figure 1:
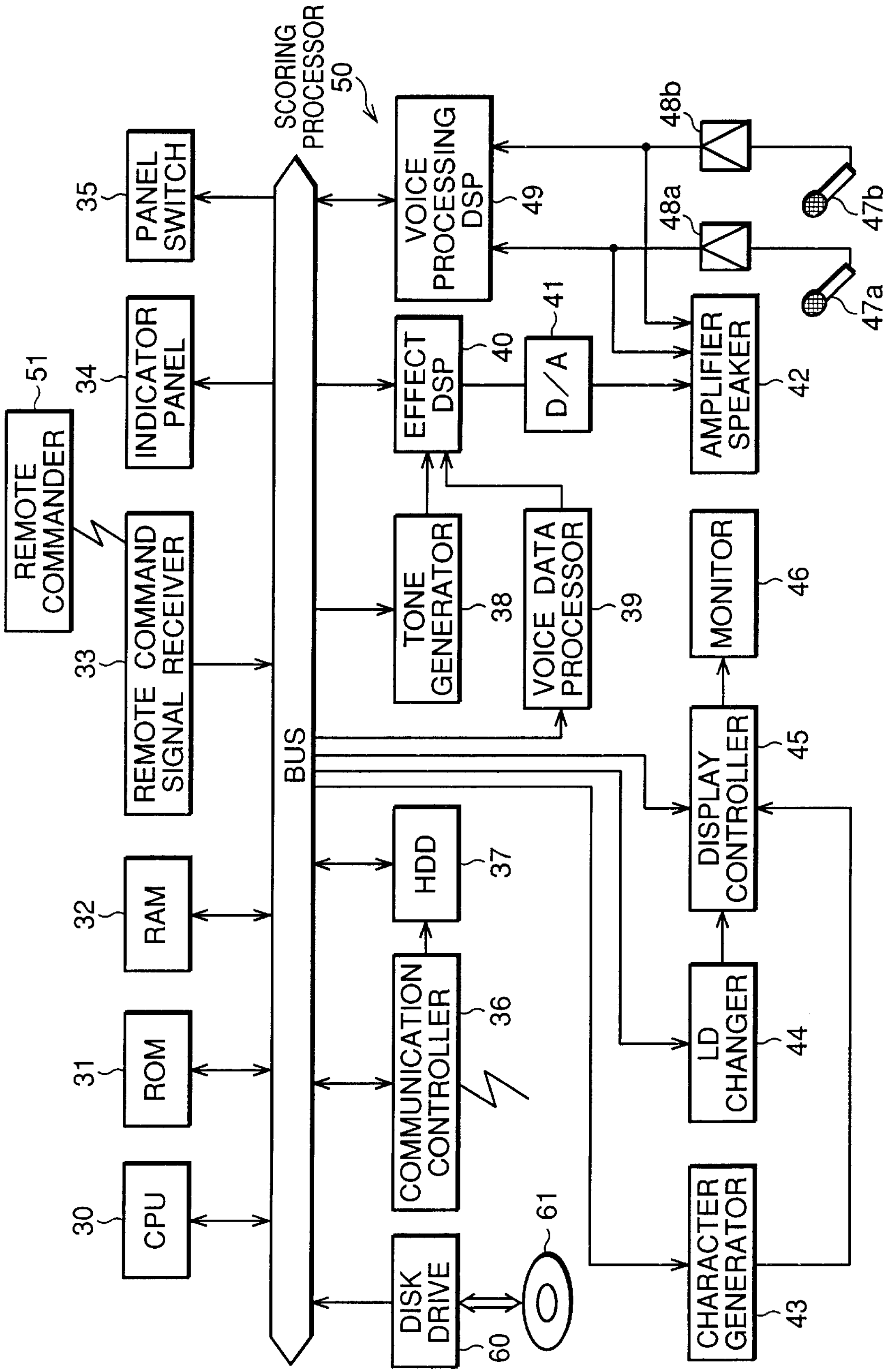
FIG. 1 is a block diagram illustrating a constitution of a karaoke apparatus practiced as one embodiment of the invention.

FIG. 1 is a block diagram illustrating an overall constitution of a karaoke apparatus practiced as one embodiment of the invention. In the figure, reference numeral 30 denotes a CPU for controlling other sections of the karaoke apparatus. The CPU 30 is connected via a bus to a ROM 31, a RAM 32, a hard disk drive (HDD) 37, a communication controller 36, a remote command signal receiver 33, an indicator panel 34, a panel switch 35, a tone generator 38, a voice data processor 39, an effect DSP 40, a character generator 43, an LD changer 44, a display controller 45, a disk drive 60 and a voice processing DSP 49.

The ROM 31 stores an initial booting program necessary for starting this karaoke apparatus. When the power to the karaoke apparatus is turned on, the initial booting program loads a system program and an application program from the HDD 37 into the RAM 32. In addition to these system program and application program, the HDD 37 stores karaoke music data files for storing karaoke music data for about 10,000 pieces of music which are reproduced for karaoke performance upon request.

Figure 2:
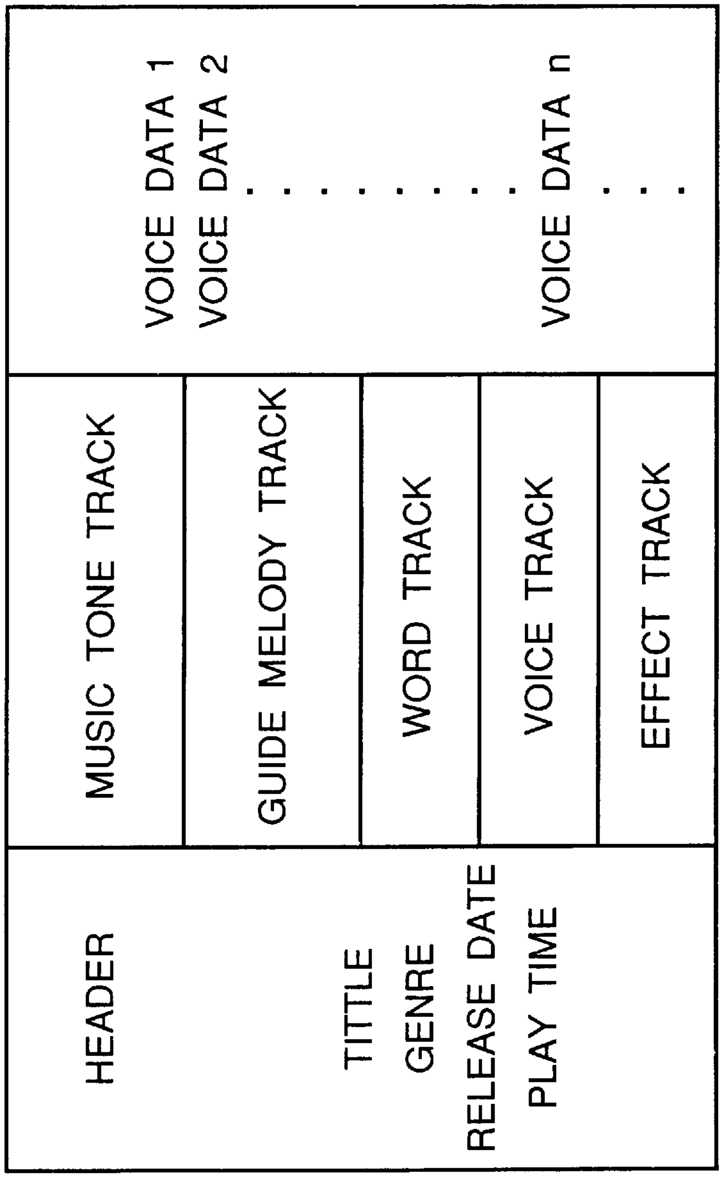
FIG. 2 is a diagram illustrating a data format of karaoke music data used in the above-mentioned embodiment.
Figure 3:
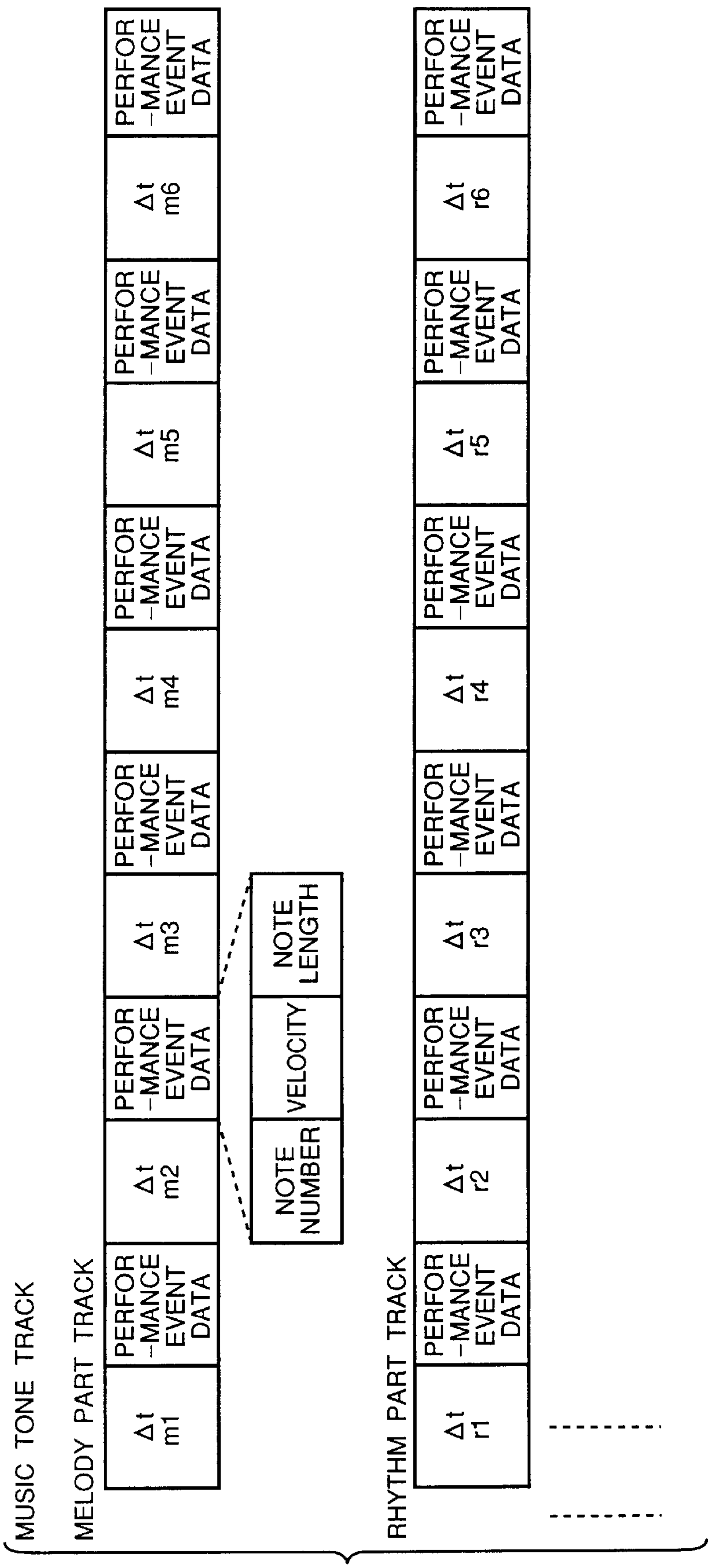
FIG. 3 is a diagram illustrating a constitution of a music tone track of the above-mentioned karaoke music data.
Figure 4:
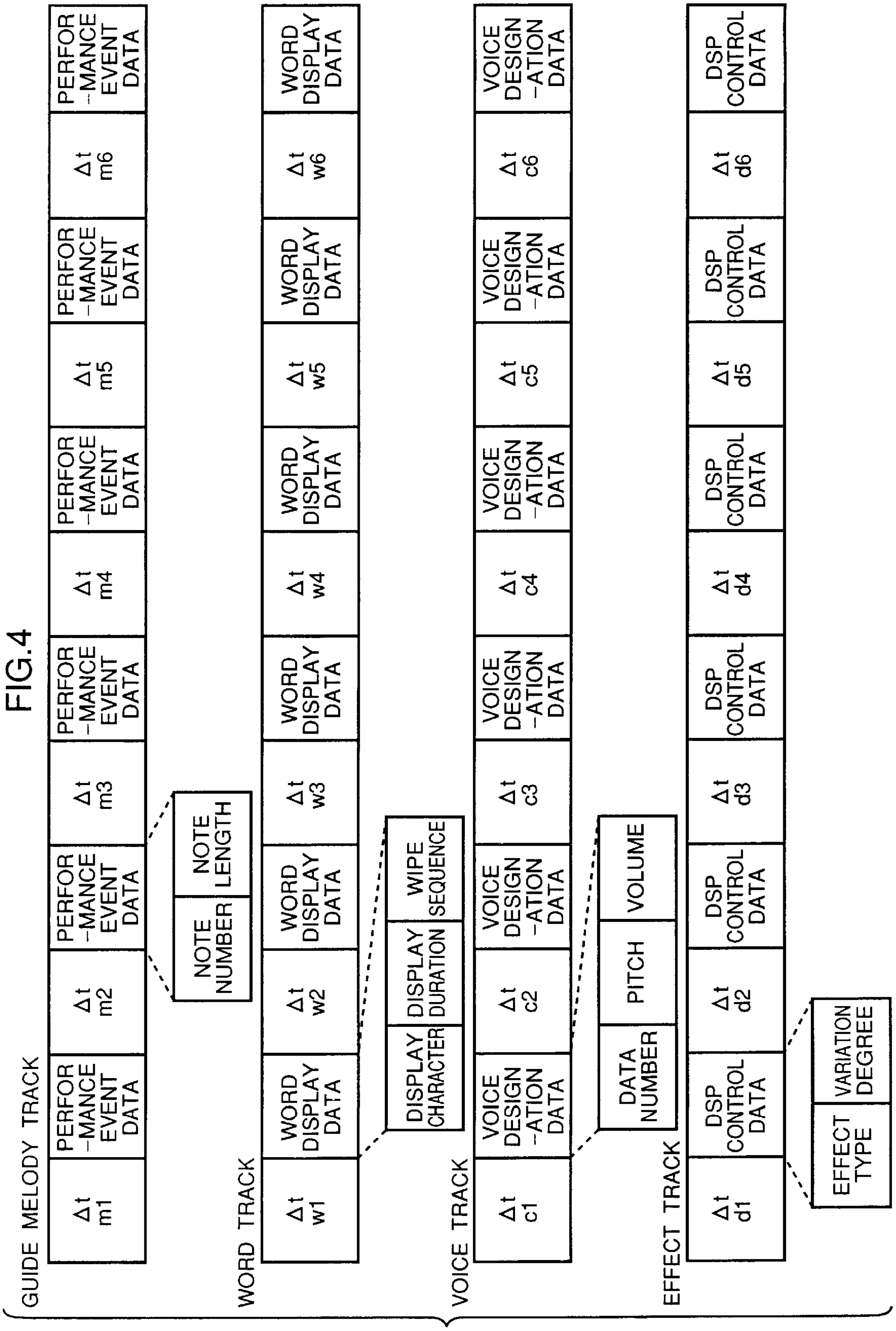
FIG. 4 is a diagram illustrating a constitution of data tracks other than the above-mentioned music tone track.

Now, referring to FIGS. 2 through 4, contents of the karaoke music data of one song will be explained. FIG. 2 is a diagram illustrating a format of karaoke music data for one piece of music. FIGS. 3 and 4 illustrate the contents of various tracks of the karaoke music data. As shown in FIG. 2, the karaoke music data consists of a header, a music tone track, a guide melody track, a word track, a voice track, an effect track, and a voice data section. The header records various information associated with the karaoke music data. For example, title, genre, release date, and play time of the karaoke music are written into the header.

Each of the music tone track through the effect track is made up of a sequence having alternate arrangement of event data and duration data Δt that indicates a time interval between successive events represented by the event data as shown in FIGS. 3 and 4. The CPU 30 is adapted to read data from these tracks in parallel by means of a sequencer program which is an application program designed for karaoke performance. The CPU 30 counts the duration data Δt at a predetermined tempo clock when reading the sequence data from each track. When the counting has been completed, the CPU 30 reads next event data following the current data. By such a manner, the CPU 30 sequentially outputs the event data to a predetermined processor. The music tone track is formed with various part tracks such as a melody track and a rhythm track as shown in FIG. 3. The music tone track provides instrumental accompaniment information used for generating karaoke accompaniment to accompany a singer.

As shown in FIG. 4, the guide melody track has sequence data about a melody line of a vocal part. Namely, the sequence data is optionally read out to generate a guide melody for guiding singing performance of a singer during play of the karaoke music. Based on this guide melody data, the CPU 30 provides reference pitch data and reference volume data, and compares these reference data with the actual singing voice. If there are a plurality of vocal parts, for example, a main melody part and a chorus melody part as in a duet song, there are also a plurality of guide melody tracks corresponding to the number of vocal parts.

The word track consists of sequence data for displaying lyric words of this karaoke music on a monitor 46. This sequence data is not regular karaoke music data of MIDI format. However, in order to facilitate implementation of the system of the karaoke apparatus, this word track is also described in MIDI format. The type of the data is a system exclusive message. The word track is composed of character codes for displaying phrases of the lyric words on the monitor, coordinates of characters on the monitor, display duration, and wipe sequence data. The wipe sequence data is used for changing display colors of the words in synchronization with the progression of the karaoke music. The wipe sequence data sequentially records a timing for changing display color of the words and a change position (coordinates) of the words.

The voice track is a sequence track for designating generation timing of voice data n (n=1, 2, 3, . . . ) stored in the voice data section. The voice data section stores human voices such as background chorus voices that are difficult to synthesize by the tone generator 38. The voice track is written with voice designation data and duration data Δt for determining reading timing of the voice designation data. Namely, the duration data Δt determines a timing for outputting the voice data to the voice data processor 39 to reproduce a voice signal. The voice designation data consists of a voice data number, pitch data, and volume data. The voice data number is identification number n of each piece of voice data recorded in the voice data section. The pitch data and the volume data designate the pitch and volume of the voice signal representative of a synthetic chorus tone. Such a background chorus tone sounds like "aaaaa" or "wa, wa, wa, wa, wa,". The synthetic background chorus tone can be used any number of times by varying the pitch and volume. Therefore, one piece of background chorus having basic pitch and volume is stored in advance. Based on the stored basic data, the pitch and volume are modified for repeated use of the background chorus. The voice data processor 39 sets an output level based on the volume data and sets the pitch of the synthetic voice signal by varying a reading rate of the voice data according to the pitch data.

The effect track is written with DSP control data for controlling the effect DSP 40. The effect DSP 40 attaches a reverberation effect or the like to signals inputted from the tone generator 38 and the voice data processor 39. The DSP control data consists of data for designating effect types and data for designating the degree of effect attachment such as a delay time and an echo level.

The karaoke music data mentioned above is read from the HDD 37 and loaded in the RAM 32 at starting of karaoke performance.

Figure 5:
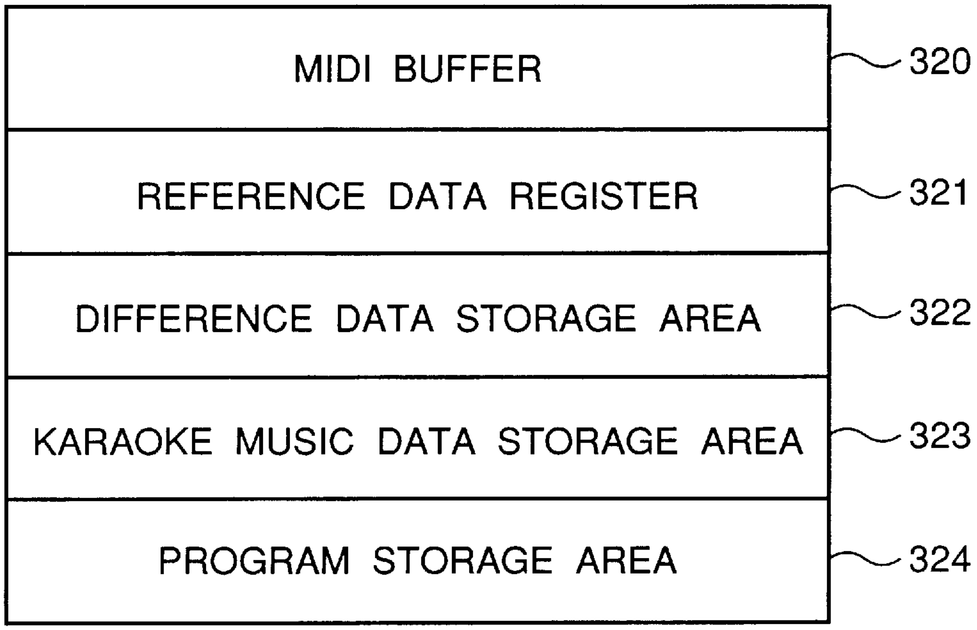
FIG. 5 is a diagram illustrating contents of a memory map of a RAM installed in the above-mentioned karaoke apparatus.

The following explains the contents of a memory map of the RAM 32. As shown in FIG. 5, the RAM 32 has a program storage area 324 for storing the loaded system program and application program. In addition, the RAM 32 has a data storage area 323 for storing the karaoke music data during the karaoke performance, a MIDI buffer 320 for temporarily storing the guide melody data, a reference data register 321 for holding reference data extracted from the guide melody data, and a difference data storage area 322 for accumulating difference data obtained by comparing the reference data with sample data extracted from the actual singing voice. The reference data register 321 is composed of a pitch data register 321*a* and a volume data register 321*b*. The difference data storage area is composed of a pitch difference data storage area 322*a*, a volume difference data storage area 322*b*, and a rhythm difference data storage area 322*c*.

Referring to FIG. 1 again, the constitution of the karaoke apparatus according to the invention will be explained further. In the figure, the communication controller 36 downloads karaoke music data and so on from a host computer via an ISDN network. The communication controller 36 transfers the received karaoke music data by means of an incorporated DMA controller directly to the HDD 37 without aide of the CPU 30. Normally, the ROM 31 stores the operating program and the application program. However, if these programs are not stored in the ROM 31 or these programs are updated, a machine readable media 61 such as a floppy disk and a CD-ROM is used to install the programs by means of the disk drive 60. The machine readable media 61 contains instructions in the form of the programs for causing the karaoke apparatus to perform the karaoke music.

The remote command signal receiver 33 receives an infrared signal transmitted from a remote commander 51, and restores commands inputted by the singer. The remote commander 51 has command switches such as a music selector switch and a numeric key pad. When the singer operates any of these keys, the remote commander 51 transmits an infrared signal modulated by a code corresponding to the operation.

The indicator panel 34 is arranged on the front side of the karaoke apparatus for displaying a code and a title of the karaoke music currently being performed and the number of reserved pieces of karaoke music. The panel switch 35 is arranged on the front side of the karaoke apparatus, and includes a music code input switch and a key change switch. The scoring capability can be turned on/off by the remote commander 51 or the panel switch 35.

The tone generator 38 forms a music tone signal representative of karaoke accompaniment based on the data recorded in the music tone track of the karaoke music data. The karaoke music data is read by the CPU 30 at starting of karaoke performance. At this moment, the music tone track and the guide melody track are concurrently read out. The tone generator 38 processes the data stored in the part tracks of the music tone track in parallel to form music tone signals of a plurality of parts simultaneously.

The voice data processor 39 forms a voice signal having a designated duration and a designated pitch based on the voice data included in the karaoke music data. The voice data is stored in the form of ADPCM data obtained by performing ADPCM on an actual waveform of background chorus voices that are difficult to generate electronically by the tone generator 38. The music tone signal generated by the tone generator 38 and the voice signal formed by the voice data processor 39 provide the karaoke performance tones. These karaoke performance tones are inputted into the effect DSP 40. The DSP 40 attaches effects such as reverberation and echo to these karaoke performance tones. The karaoke performance tones attached with these effects are converted by a D/A converter 41 into an analog signal, which is outputted to an amplifier/speaker 42.

Reference numerals 47*a* and 47*b* denote microphones for collecting singing voices. Singing voice signals inputted from the microphones 47*a* and 47*b* are amplified by preamplifiers 48*a* and 48*b*, respectively, and then inputted into the amplifier/speaker 42 and the voice processing DSP 49. Each singing voice signal inputted into the voice processing DSP 49 is converted into a digital signal, on which signal processing for scoring skill of the singer is performed. A constitution including the voice processing DSP 49 and the CPU 30 implements a scoring processor 50.

The amplifier/speaker 42 amplifies the inputted karaoke performance tone signals and the singing voice signals. Moreover, the amplifier/speaker 42 attaches effects such as echo to the singing voice signals, and sounds the resultant singing voice signals.

The character generator 43 reads font data corresponding to the inputted character codes representative of the title and the lyric words from an internal ROM, and outputs the read font data. The LD changer 44 reproduces a background image from a corresponding LD based on inputted image selection data which designates a chapter number of the LD. The image selection data is determined based on the genre data of the karaoke music concerned. This genre data is written in the header of the karaoke music data, and is read by the CPU 30 at starting of karaoke performance. The CPU 30 determines which background image is to be reproduced according to the genre data. The CPU 30 outputs the image selection data designating the determined background image to the LD changer 44. The LD changer 44 accommodates about five laser discs, from which about 120 scenes of background images can be reproduced. Based on the image selection data, one of these scenes is selected and outputted as image data. The display controller 45 superimposes this image data on the font data representative of the words outputted from the character generator 43. The superimposed composite image is displayed on the monitor 46.

Figure 6:
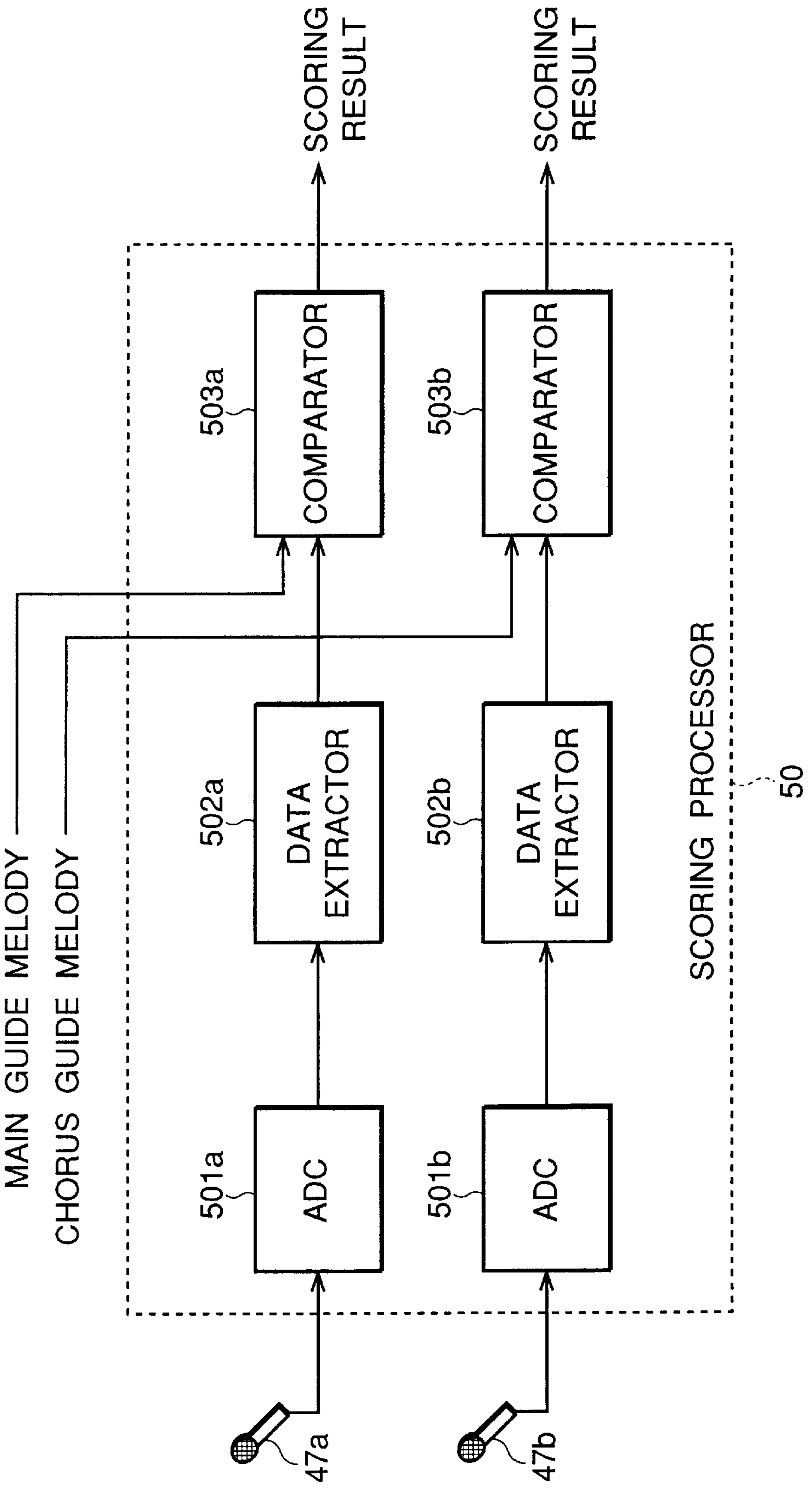
FIG. 6 is a block diagram illustrating a constitution of a scoring processor contained in the above-mentioned karaoke apparatus.

The following explains the scoring processor 50 of the present embodiment. This scoring processor 50 is constituted by a hardware including the above-mentioned voice processing DSP 49 and the CPU 30 and a scoring software provided in the form of an application program. FIG. 6 is a block diagram illustrating the functional constitution of the scoring processor 50. In the figure, the scoring processor 50 is composed of two systems corresponding to the two microphones 47*a* and 47*b*. These systems have A/D converters 501*a* and 501*b*, data extractors 502*a* and 503*a*, and comparators 503*a* and 503*b*.

The A/D converters 501*a* and 501*b* convert the singing voice signals supplied from the microphones 47*a* and 47*b*, respectively, into digital signals. The data extractors 502*a* and 502*b* extract pitch data and volume data from the digitized singing voice signals at every sampling period of 50 ms. The pitch data and volume data are a suitable music property characteristic to singing skill of the singer. The comparators 503*a* and 503*b* compare the pitch data and the volume data extracted from the digitized singing voice signals with the reference pitch data and the reference volume data derived from the guide melody of the respective parts corresponding to the singing voices, and score the singing skill of each singer. In the case of a duet song, the comparator 503*a* compares the first singing voice inputted from the microphone 47*a* with the first guide melody of the main vocal part for scoring. On the other hand, the comparator 503*b* compares the second singing voice inputted from the other microphone 47*b* with the second guide melody of the chorus part for scoring. It should be noted that the sampling rate of 50 ms is equivalent to a thirty-second note in a metronome tempo of 120. This sampling rate provides a resolution sufficient for extracting the musical property or vocalism features of the singing voices.

Figure 7:
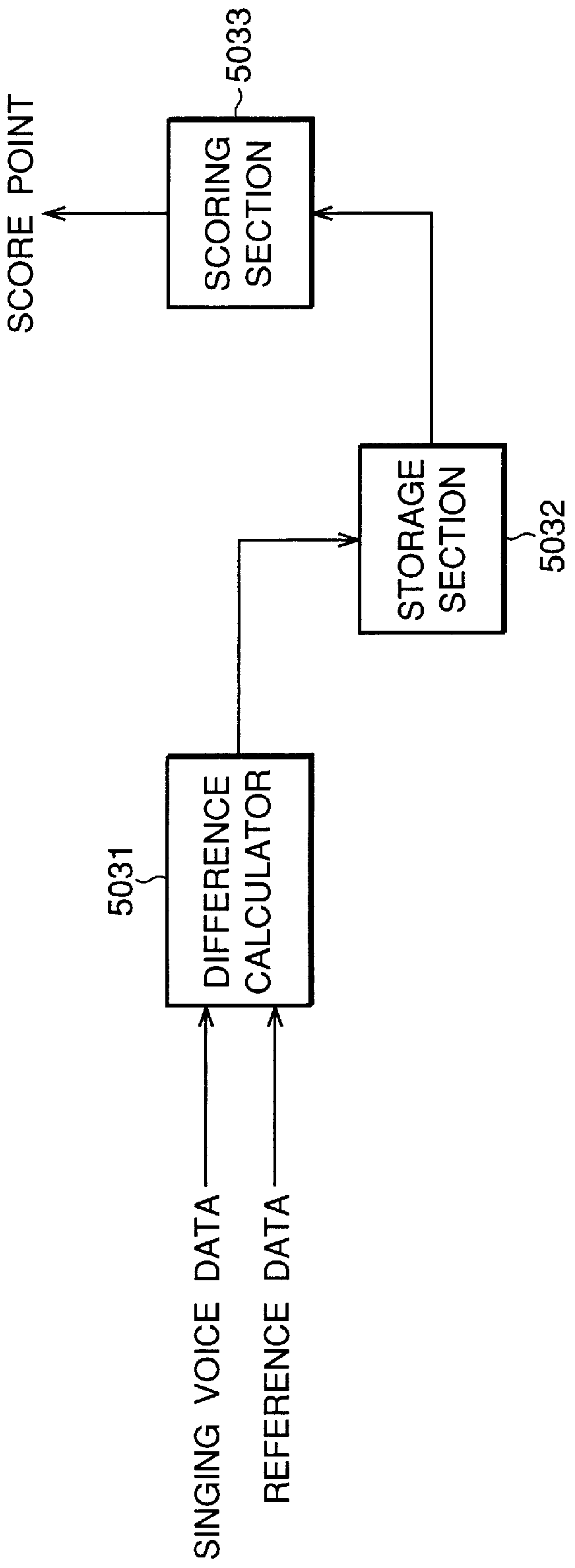
FIG. 7 is a block diagram illustrating a constitution of a comparator contained in the above-mentioned scoring processor.

The following explains the comparators 503a and 503b in further detail. The comparator 503a and the comparator 503b are the same in constitution except for the guide melodies to be inputted. FIG. 7 is a block diagram illustrating a constitution of the comparator 503a. In the figure, the pitch data and volume data inputted from the extractor 502a (hereafter generically referred to as singing voice data) and the pitch data and volume data of the guide melody (hereafter generically referred to as reference data) are inputted into a difference calculator 5031. The difference calculator 5031 computes a difference between the singing voice data and the reference data at every 50 ms whenever the singing voice data is inputted, and outputs the computed difference as real-time difference data including pitch difference data and volume difference data. The difference calculator 5031 further detects deviation of a rise timing of the volume of the singing voice from a corresponding rise timing of the volume of the reference data, and outputs the detected deviation as rhythm difference data which is secondarily obtained from the primary volume data of the singing voice.

The detected difference data is successively stored in a storage section 5032 which is the difference data storage area 322 of the RAM 32. This storage of the difference data is made any time during the course of the music performance. When the performance of a piece of karaoke music comes to an end, a scoring section 5033 sequentially reads the difference data reserved in the storage section 5032. The scoring section accumulates the sequentially read difference data for each item of the music properties which are classified into pitch, volume, and rhythm. Based on these accumulated values, the scoring section 5033 obtains reduction values for scoring the music properties. The scoring section subtracts each reduction value from a full mark of 100 point to obtain the score point for each item of the music properties. The scoring section 5033 outputs an average value of the scoring points of the music properties as a final scoring result.

A constitution of the comparator 503b is generally the same as that of the comparator 503a except for the guide melody to be inputted as the reference. In the case of a duet song, the comparator 503a uses the guide melody of the main vocal part as the reference for scoring. On the other hand, the comparator 503b uses the guide melody of the chorus part as the reference for scoring. This constitution allows the individual and separate scoring of the singing skills of both singing voices allotted lo the main part and chorus part of the duet song.

Figure 8A:
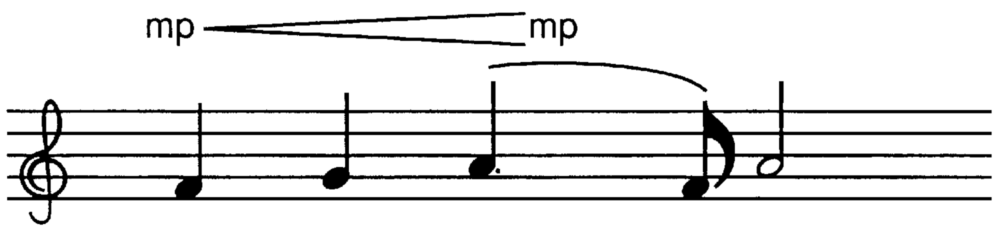
FIG. 8A is a diagram illustrating an example of guide melody used in the above-mentioned embodiment.
Figure 8B:
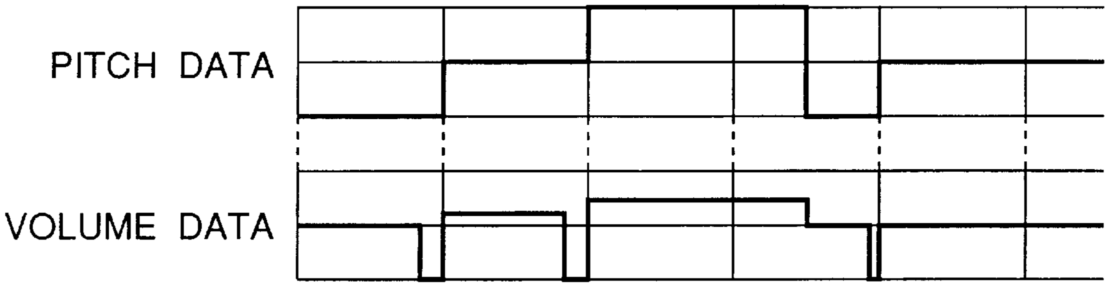
FIG. 8B is a diagram illustrating reference pitch data and reference volume data derived from the above-mentioned guide melody.
Figure 8C:
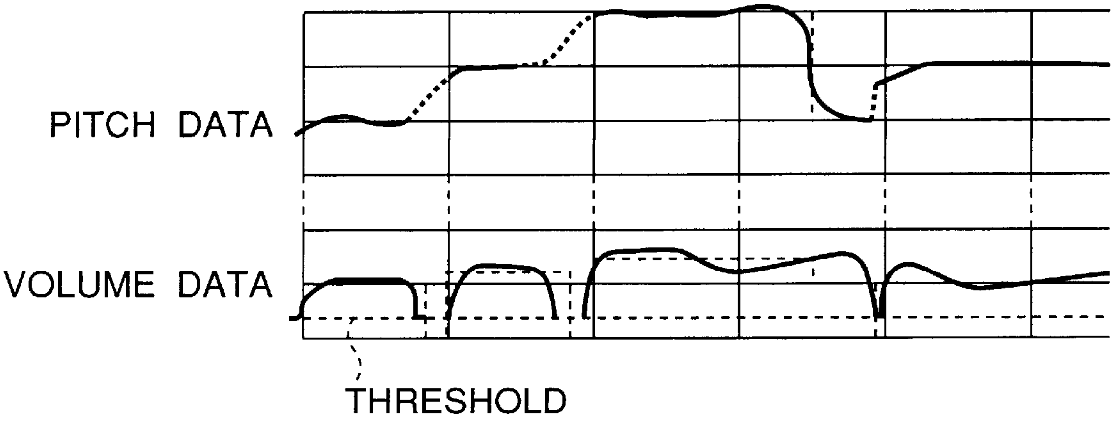
FIG. 8C is a diagram illustrating actual pitch data and actual volume data of a singing voice.

Now, referring to FIGS. 8A through 8C and 9, the singing voice data, the reference data, and the difference data will be explained. FIGS. 8A and 8B show an example of a guide melody providing the reference. FIG. 8A shows the guide melody represented in the form of a score. FIG. 8B shows results of converting each note of this score into p)itch data and volume data with a gate time of about 80 percent. As shown, the volume goes up and down according to a vocalism instruction of mp →crescendo→ mp. On the other hand, FIG. 8C shows actual variation of the pitch and the volume appearing in the live singing voice. As shown, both of the actual pitch and the volume slightly deviate from the reference values. The rise timing of the actual volume data corresponding to each note also deviates from the rise timing of the volume data of the reference.

Figure 9:
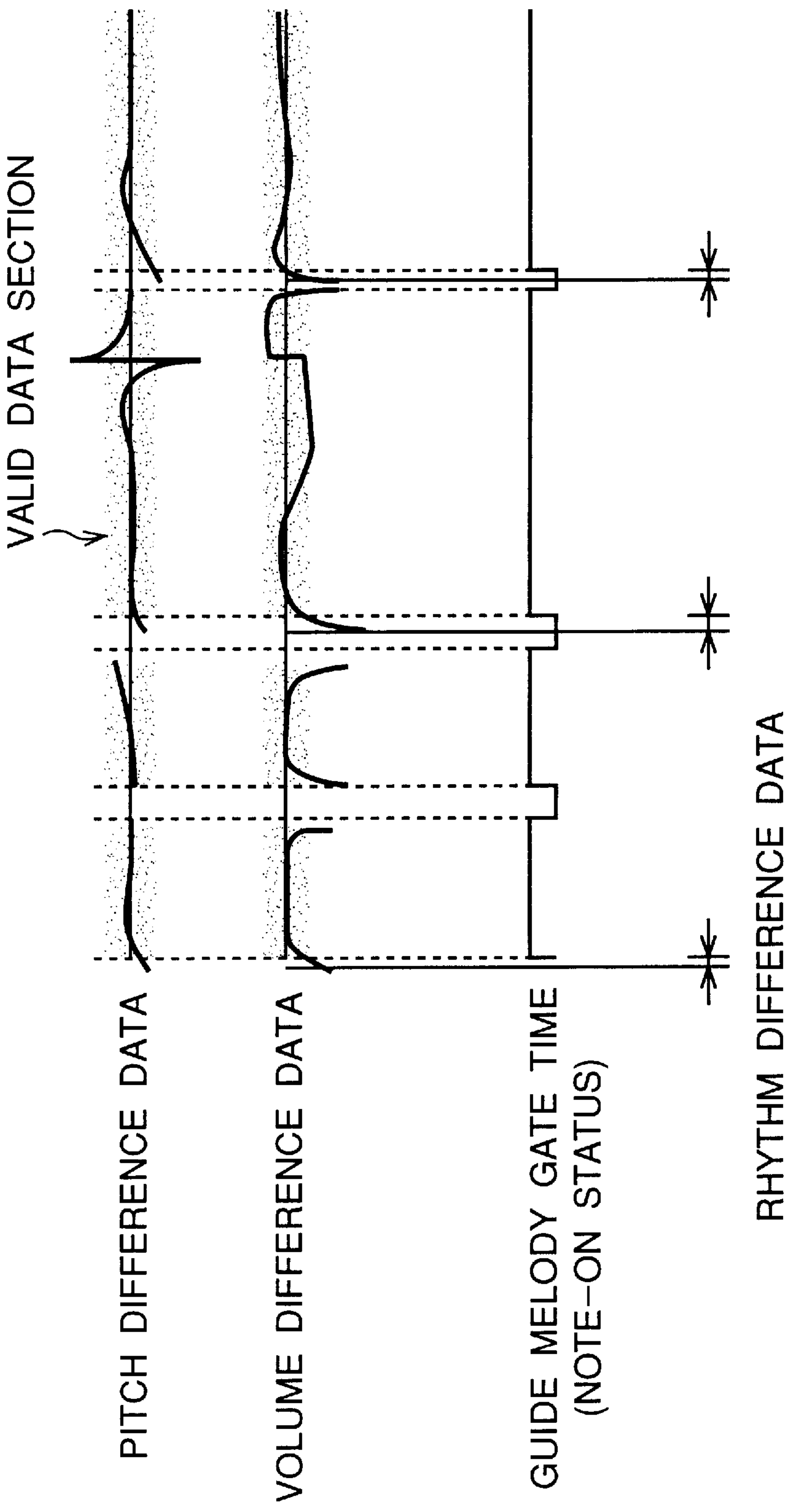
FIG. 9 is a diagram illustrating difference data obtained in the above-mentioned embodiment.

FIG. 9 shows difference data obtained by computing a difference between the reference shown in FIG. 8B and the singing voice shown in FIG. 8C. In FIG. 9, the pitch difference data and the volume difference data denote how much the pitch and the volume deviate from the respective reference values. Rhythm difference data is secondarily obtained as a deviation in the rise timing of each note between the reference volume and the actual volume of the singing voice. In this figure, the pitch difference data and the volume difference data are both shown as continuous values. It will be apparent that these items of the difference data may be quantized into a plurality of levels.

According to the example shown in FIG. 9, although the reference data indicates a certain vocalization time of note-on status, the singing voice is not inputted by failure of the vocalization. On the other hand, although the reference indicates a certain non-vocalization time of note-off status, the singing voice is inadvertently inputted. In these cases, since one of the data to be compared with each other is missing, such data is not used as valid data. Only when both pieces of data to be compared with each other are present, such data is treated as valid.

According to the invention, the karaoke apparatus is constructed for accompanying a karaoke music on a singer according to music information. In the karaoke apparatus, a providing device in the form of the HDD 37 provides the music information containing accompaniment data and at least first reference data and second reference data, respectively, corresponding to a first part and a second part of the karaoke music. A generating device in the form of the tone generator 38 generates the karaoke music according to the accompaniment data while a first singer sings the first part along with the karaoke music and a second singer sings the second part along with the karaoke music. A collecting device including the pair of the microphones 47a and 47b collects a first singing voice of the first singer and a second singing voice of the second singer during progression of the karaoke music. An extracting device in the form of the extractors 502a and 502b extracts from the collected first singing voice a first music property characteristic to a singing skill of the first singer, and separately extracts from the second singing voice a second music property characteristic to a singing skill of the second singer. A scoring device in the form of the comparators 503a and 503b compares the first music property with the first reference data to evaluate the singing skill of the first singer, and compares the second music property with the second reference data to evaluate the singing skill of the second singer so that the singing skill of the first singer and the second singer can be scored individually and independently from one another while the first singing voice and the second singing voice are mixed to each other.

Preferably, the providing device provides the music information of a duet karaoke music such that the first part is assigned to a main vocal part and the second part is assigned to a chorus vocal part, and the scoring device evaluates the singing skill of the first singer who sings the main vocal part and evaluates the singing skill of the second singer who sings the chorus vocal part jointly with the first singer.

Preferably, the extracting device extracts the first music property in terms of at least one of pitch, volume and rhythm of the first singing voice, and separately extracts the second music property in terms of at least one of pitch, volume and rhythm of the second singing voice. Practically, the extracting device extracts the first music property in terms of all of pitch, volume and rhythm of the first singing voice, and separately extracts the second music property in terms of all of pitch, volume and rhythm of the second singing voice. In such a case, the extracting device secondarily extracts the rhythm of the first singing voice according to variation of the volume which is primarily extracted from the first singing voice, and secondarily extracts the rhythm of the second singing voice according to variation of the volume which is primarily extracted from the second singing voice.

Preferably, the providing device provides the first reference data based on a first guide melody contained in the karaoke music to guide the first part, and provides the second reference data based on a second guide melody contained in the karaoke music to guide the second part.

Preferably, the extracting device successively extracts samples of the first music property and samples of the second music property during the progression of the karaoke music, and the scoring device successively calculates a difference between each sample of the first music property and the first reference data and accumulates the calculated difference to obtain a first score point representative of the singing skill of the first singer, and successively calculates a difference between each sample of the second music property and the second reference data and accumulates the calculated difference to obtain a second score point representative of the singing skill of the second singer. If desired, the scoring device includes an averaging device that averages the first score point and the second score point so as to evaluate a total singing skill of the first singer and the second singer.

The following explains the scoring operation of the present embodiment by using karaoke music of a duet song, for example. In what follows, the explanation will be made with reference to the flowcharts shown in FIGS. 10 through 14. The scoring operation indicated in these flowcharts is performed concurrently with execution of the sequence program for controlling the progression of karaoke performance while transferring data with this sequence program.

Figure 10:
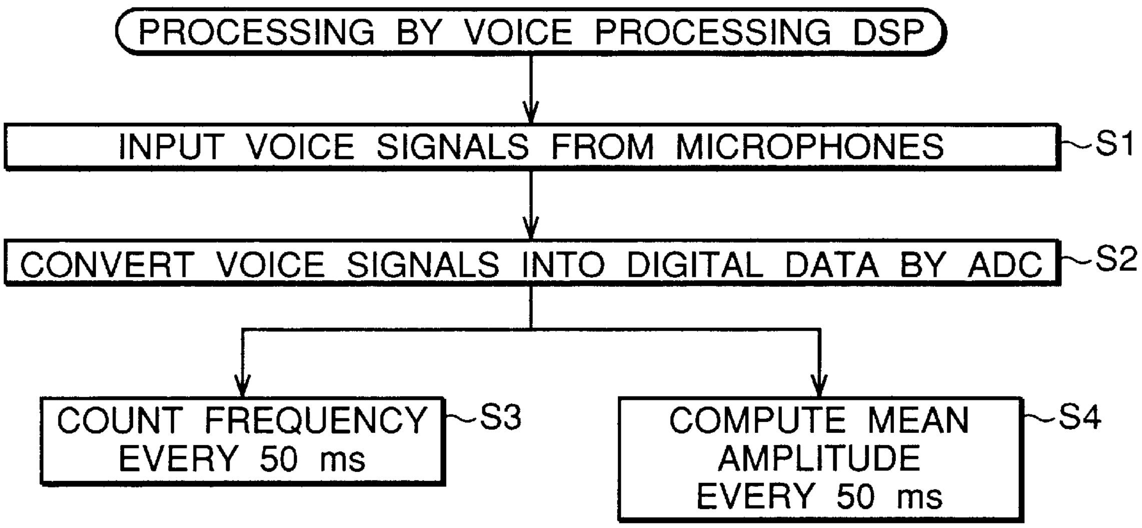
FIG. 10 is a flowchart for explaining operations of a voice processing DSP contained in the above-mentioned embodiment.

First, the processing for capturing data will be explained. FIG. 10 is a flowchart indicating the operation of the voice processing DSP 49. When a duet song is sung, the singing voice signals are inputted from the two microphones 47*a* and 47*b* (S1). The singing voice signals are converted by the A/D converters 501*a* and 501*b* into digital data (S2). The resultant pieces of digital data are inputted into the data extractors 502*a* and 502*b*, respectively. The digital data is frequency-counted in a unit of frame time of 50 ms (S3). At the same time, a mean value of amplitude of the digital data is computed (S4). The resultant frequency count value and the mean amplitude value are read by the CPU 30 every 50 ms.

Figure 11:
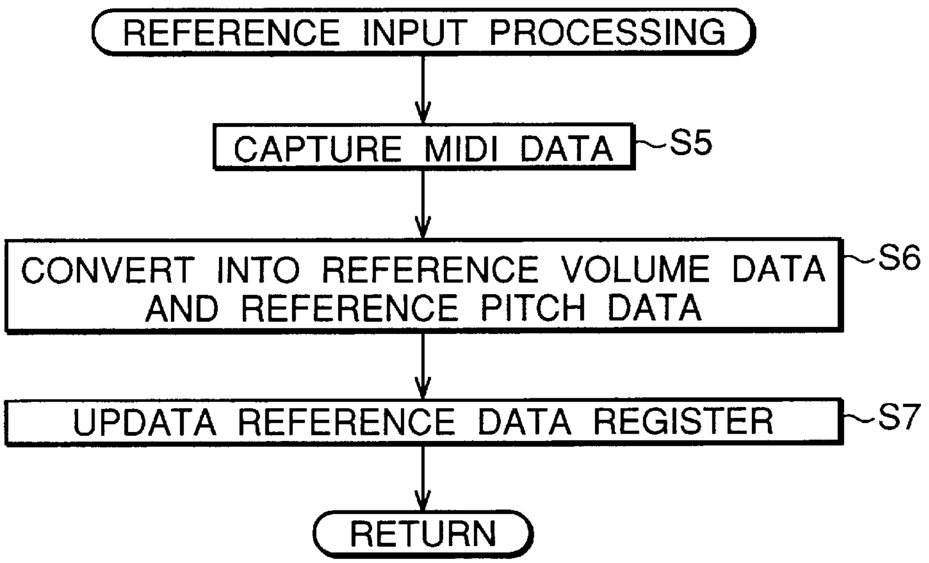
FIG. 11 is a flowchart for explaining reference input processing in the above-mentioned embodiment.

FIG. 11 is a flowchart indicating reference input processing. This processing is performed when event data contained in the guide melody track is passed from the sequence program that is executed to carry out the karaoke performance. In the present embodiment, the karaoke performance of a duet song is being made. In this case, the references of the guide melodies corresponding to two vocal parts of main and chorus are inputted. First, the MIDI data of the guide melodies passed from the sequence program is held in the MIDI buffer 320 (S5). Each piece of the MIDI data is converted into volume data and pitch data (S6). To be more specific, the note number and pitch bend data of note-on data in the MIDI format are converted into reference the pitch data. The velocity data and after-touch (key pressure) data of the note-on data are converted into the reference volume data. Based on the resultant pitch data and the volume data of the guide melodies, the reference data register 321 of the RAM 32 is updated (S7). Therefore, the reference data register 321 is updated every time new guide melody data is inputted.

It should be noted that the data of guide melodies may be transferred not as MIDI data but as pitch data and volume data. In this case, the pitch data and the volume data may be written to the reference data register 321 without performing the above-mentioned conversion. Alternatively, a descriptive format of the pitch data and the volume data may be given as the MIDI format. In this case, these MIDI-formatted data may be described in a system exclusive message. Alternatively, this MIDI format may be substituted by a general-purpose channel message, for example, note-on data, pitch bend data, and key pressure data.

Figure 12:
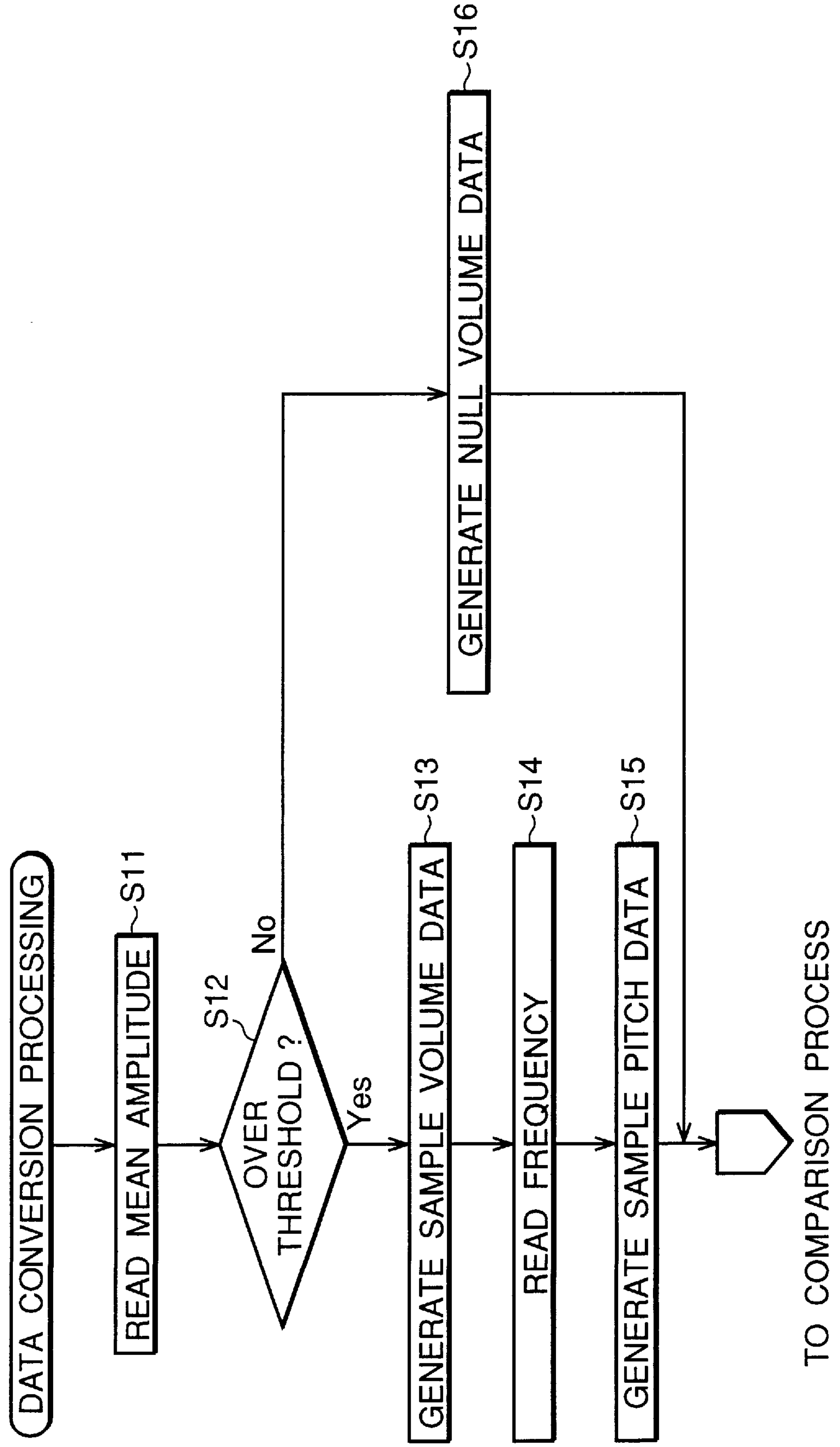
FIG. 12 is a flowchart for explaining data conversion processing in the above-mentioned embodiment.

FIG. 12 is a flowchart indicating data conversion processing. This is the processing in which the CPU 30 captures the frequency count value and the mean amplitude value of the singing voice signals from the voice processing DSP 49, and converts the captured data into the pitch data and the volume data of the singing voices. This processing is performed every 50 ms, that is one frame time of the singing voice signal. First, the CPU 30 reads the mean amplitude value from the voice processing DSP 49 (S11). The CPU 30 determines whether the mean amplitude value is over a threshold or not (S12). If the mean amplitude value is found over the threshold, the CPU 30 generates the sample volume data based on this mean amplitude value (S13). The CPU 30 reads the frequency count value from the voice processing DSP 49 (S14). Based on this frequency count value, the CPU 30 generates the sample pitch data (S15). Then, the process goes to comparison processing to be described later. If the mean amplitude value is found lower than the threshold in S12, the CPU 30 determines that the singer is not singing or vocalizing, and generates null volume data (S16). In this case, the process goes to the comparison processing without generating the pitch data. The above-mentioned data conversion is performed on each of the singing voices inputted from the two microphones 47*a* and 47*b*.

Figure 13:
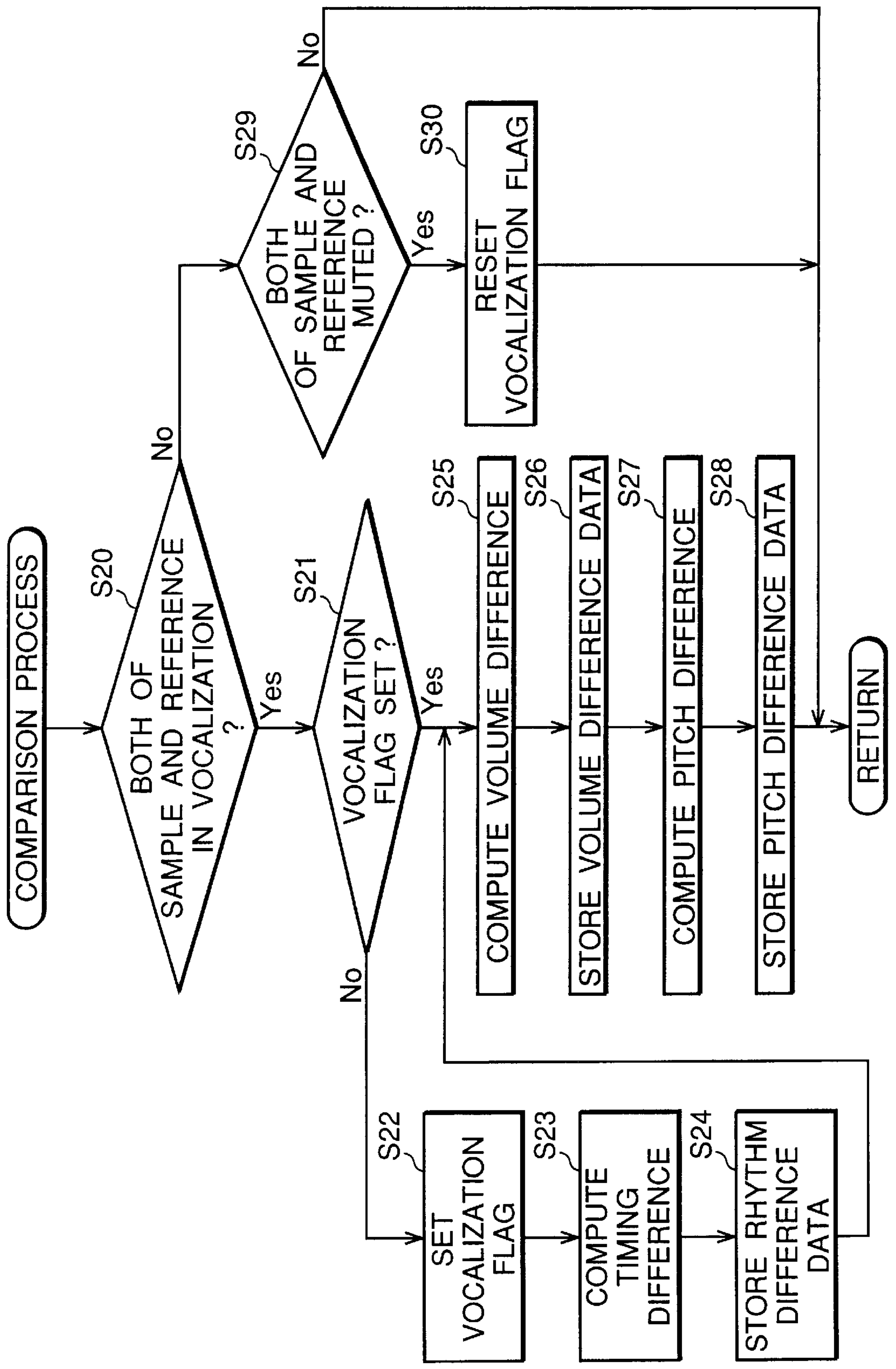
FIG. 13 is a flowchart for explaining comparison processing in the above-mentioned embodiment.

FIG. 13 is a flowchart indicating the comparison processing. In this comparison processing, the sample pitch data and volume data of each of the singing voices generated by the data conversion processing shown in FIG. 12 are compared with the reference pitch data and volume data of each of the main part and the chorus part obtained by the reference input shown in FIG. 11 to obtain the difference data for each of the main part and the chorus part. The comparison processing is performed every 50 ms in synchronization with the above-mentioned data conversion processing.

To be more specific, it is determined whether the volume data of the reference and the volume data of the singing voice are both over a predetermined threshold to indicate vocalization state (S20). If both are found in vocalization, it is determined whether a vocalization flag is set (S21). The vocalization flag is set in S22 when both the reference and the singing voice have been substantially put in the vocalization state. At the beginning of the karaoke performance, the vocalization flag is still kept reset. Therefore, the process goes from step S21 to step S22. In step S22, the vocalization flag is set. Further, a difference between the rise timings of the reference and the singing voice is computed (S23). The computed difference is reserved in the rhythm difference data storage area 322*c* as rhythm difference data (S24). The process goes to step S25. If the vocalization flag is already in the set state because the vocalization is on, the process goes from step S21 directly to step S25.

Next, the volume data of the singing voice is compared with the volume data of the reference to compute a volume difference (S25). The computed difference is reserved in the volume data difference data storage area 322*b* of the RAM 32 as volume difference data (S26). Likewise, the pitch difference data is computed and the computed data is reserved in the pitch difference data storage area 322*a* (S27 and S28).

On the other hand, if both the signing voice and the reference are found not in the vocalization state, the process goes from step S20 to step S29, in which it is determined whether both are muted. If both are found muted in step S29, the vocalization flag is reset (S30), upon which the comparison processing comes to an end. If both are not in the muted state, it indicates that there is a deviation or discrepancy between then singing timing and the note on/off timing. In such a case, the comparison processing comes to an end. Thus, the volume difference data, pitch difference data, and rhythm difference data in the valid section shown in FIG. 9 are reserved in the difference data storage area 322. The above-mentioned processing operations are performed for each of the main and chorus parts in parallel.

Figure 14:
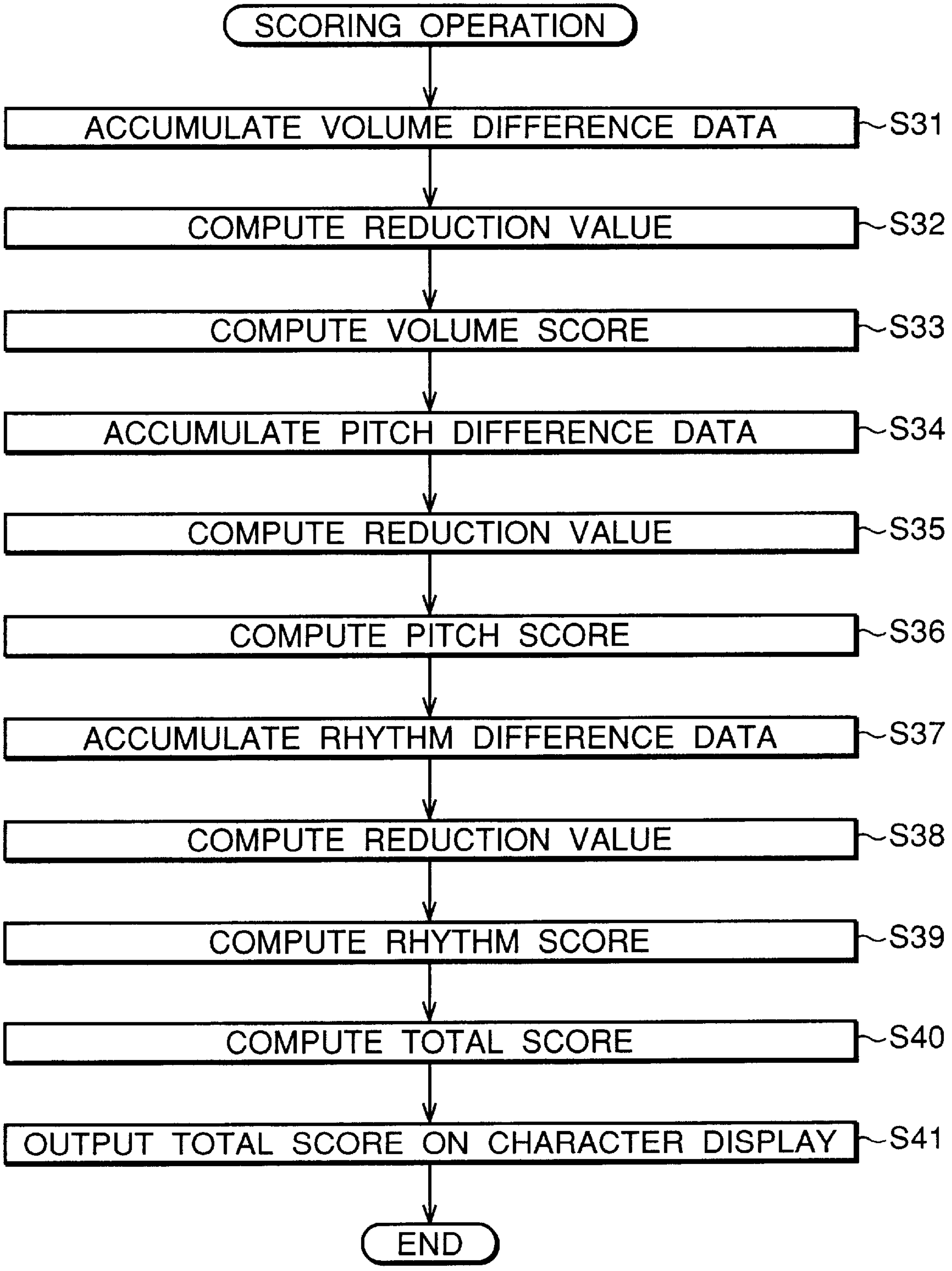
FIG. 14 is a flowchart for explaining scoring operation in the above-mentioned embodiment.

FIG. 14 is a flowchart indicating scoring processing. This processing is performed upon termination of the performance of the karaoke music. First, as soon as the performance of music comes to an end, the samples of the volume difference data of the main and chorus parts are respectively accumulated (S31) to compute a reduction value (S32). The reduction value is subtracted from the full mark of 100 percent to compute a score for the volume (S33). Likewise, samples of the pitch difference data and the rhythm difference data are respectively accumulated to compute reduction values, thereby computing the scores for pitch and rhythm (S34 through S39). The scores for these three music properties are averaged for each of the main and chorus parts to compute an overall score (S40). The character generator 43 converts the scores for the main and chorus parts into font character patterns to display the scores.

Thus, according to the above-mentioned embodiment, different vocal parts such as main melody and chorus melody inputted from the two microphones 47*a* and 47*b* are individually scored by comparing each of the singing voices with the corresponding reference or guide melody, thereby allowing the proper evaluation of each part.

The present invention is not limited to the above-mentioned embodiment and hence the following variations be made without departing from the scope of the appended claims.

(1) In the above-mentioned embodiment, a duet song for example is used for karaoke performance. It will be apparent that the present invention is also applicable to a chorus composed of three or more vocal parts. In this case, the scoring processor 50 is extended by the increased number of vocal parts. The number of guide melodies is increased by the increased number of vocal parts. It will be also apparent that use of a shared guide melody as reference allows a plurality of singers to compare their singing skill with each other based on the common reference.

(2) In the above-mentioned embodiment, the average values of the music properties are obtained as the final scoring results. It will be apparent that the scores for pitch, volume, and rhythm may be outputted as they are for each of the music properties.

(3) In the scoring processing shown in FIG. 14, the scoring operations are collectively made when the performance of music comes to an end. It will be apparent that basic evaluation as may be sequentially made on a phrase or note basis, thereafter aggregating the evaluation results at the end of performance.

(4) In the above-mentioned embodiment, the scores obtained for the vocal parts are outputted individually. It will be apparent that an average of these scores may be outputted. This is different from the conventional scoring method in which singing voices are mixed and the mixed voice is compared with one reference for scoring. In the present invention, different singing voices are compared with different references, and the resultant scores are averaged. Therefore, the scoring results obtained by the novel constitution essentially differ from those obtained conventionally. Namely, the novel constitution allows total evaluation of the chorus based on the proper evaluation of the individual vocal parts.

(5) The highest of the scores among a plurality of singing voices may be highlighted for example to further enhance the enjoyment of karaoke singers.

As described above, the inventive method of accompanying a karaoke music on a singer according to music information comprises the steps of providing the music information containing accompaniment data and at least first reference data and second reference data, respectively, corresponding to a first part and a second part of the karaoke music, generating the karaoke music according to the accompaniment data while a first singer sings the first part along with the karaoke music and a second singer sings the second part along with the karaoke music, collecting a first singing voice of the first singer and a second singing voice of the second singer during progression of the karaoke music, extracting from the collected first singing voice a first music property characteristic to a singing skill of the first singer, separately extracting from the second singing voice a second music property characteristic to a singing skill of the second singer, comparing the first music property with the first reference data to evaluate the singing skill of the first singer, and comparing the second music property with the second reference data to evaluate the singing skill of the second singer so that the singing skill of the first singer and the singing skill of the second singer can be scored individually and independently from one another while the first singing voice and the second singing voice are mixed to each other.

Preferably, the step of providing provides the music information of a duet karaoke music such that the first part is assigned to a main vocal part and the second part is assigned to a chorus vocal part, and the step of comparing evaluates the singing skill of the first singer who sings the main vocal part and evaluates the singing skill of the second singer who sings the chorus vocal part jointly with the first singer.

Preferably, the step of extracting extracts the first music property in terms of pitch, volume and rhythm of the first singing voice, and separately extracts the second music property in terms of pitch, volume and rhythm of the second singing voice. Practically, the step of extracting secondarily extracts the rhythm of the first singing voice according to variation of the volume which is primarily extracted from the first singing voice, and secondarily extracts the rhythm of the second singing voice according to variation of the volume which is primarily extracted from the second singing voice.

Preferably, the step of providing provides the first reference data based on a first guide melody contained in the karaoke music to guide the first part, and provides the second reference data based on a second guide melody contained in the karaoke music to guide the second part.

Preferably, the step of extracting successively extracts samples of the first music property and samples of the second music property during the progression of the karaoke music, and the step of comparing successively calculates a difference between each sample of the first music property and the first reference data and accumulates the calculated difference to obtain a first score point representative of the singing skill of the first singer, and successively calculates a difference between each sample of the second music property and the second reference data and accumulates the calculated difference to obtain a second score point representative of the singing skill of the second singer.

As mentioned above and according to the invention, when a plurality of vocal parts are sung as in a duet song, for example, the singing voice of each vocal part is properly evaluated, thereby providing correct scoring results. Further, proper evaluation can be made on an entire chorus.

What is claimed is:

1. A karaoke apparatus accompanying a karaoke music on a singer according to music information, comprising:

a providing device that provides the music information containing accompaniment data and at least first reference data and second reference data, respectively, corresponding to a first part and a second part of the karaoke music;

a generating device that generates the karaoke music according to the accompaniment data while a first singer sings the first part along with the karaoke music and a second singer sings the second part along with the karaoke music;

a collecting device that collects a first singing voice of the first singer and a second singing voice of the second singer during progression of the karaoke music;

an extracting device that extracts from the collected first singing voice a first music property characteristic to a singing skill of the first singer, and separately extracts from the second singing voice a second music property characteristic to a singing skill of the second singer; and a scoring device that compares the first music property with the first reference data to evaluate the singing skill of the first singer, and compares the second music property with the second reference data to evaluate the singing skill of the second singer so that the singing skill of the first singer and the singing skill of the second singer can be scored individually and independently from one another while the first singing voice and the second singing voice are mixed to each other.

2. A karaoke apparatus according to claim 1, wherein the providing device provides the music information of a duet karaoke music such that the first part is assigned to a main vocal part and the second part is assigned to a chorus vocal part, and wherein the scoring device evaluates the singing skill of the first singer who sings the main vocal part and evaluates the singing skill of the second singer who sings the chorus vocal part jointly with the first singer.

3. A karaoke apparatus according to claim 1, wherein the extracting device extracts the first music property in terms of at least one of pitch, volume and rhythm of the first singing voice, and separately extracts the second music property in terms of at least one of pitch, volume and rhythm of the second singing voice.

4. A karaoke apparatus according to claim 3, wherein the extracting device extracts the first music property in terms of pitch, volume and rhythm of the first singing voice, and separately extracts the second music property in terms of pitch, volume and rhythm of the second singing voice.

5. A karaoke apparatus according to claim 4, wherein the extracting device secondarily extracts the rhythmn of the first singing voice according to variation of the volume which is primarily extracted from the first singing voice, and secondarily extracts the rhythm of the second singing voice according to variation of the volume which is primarily extracted from the second singing voice.

6. A karaoke apparatus according to claim 1, wherein the providing device provides the first reference data based on a first guide melody contained in the karaoke music to guide the first part, and provides the second reference data based on a second guide melody contained in the karaoke music to guide the second part.

7. A karaoke apparatus according to claim 1, wherein the extracting device successively extracts samples of the first music property and samples of the second music property during the progression of the karaoke music, and wherein the scoring device successively calculates a difference between each sample of the first music property and the first reference data and accumulates the calculated difference to obtain a first score point representative of the singing skill of the first singer, and successively calculates a difference between each sample of the second music property and the second reference data and accumulates the calculated difference to obtain a second score point representative of the singing skill of the second singer.

8. A karaoke apparatus according to claim 7, wherein the scoring device includes an averaging device that averages the first score point and the second score point so as to evaluate a total singing skill of the first singer and the second singer.

9. A karaoke apparatus accompanying a singer with a karaoke music according to music information, comprising:

means for providing the music information containing accompaniment data and reference data;

means for generating the karaoke music according to the accompaniment data while a plurality of singers sing altogether along with the karaoke music;

means for collecting one singing voice of one singer and another singing voice of another singer during progression of the karaoke music;

means for extracting from said one singing voice a music property characteristic to a singing skill of said one singer, and for separately extracting from said another singing voice another music property characteristic to a singing skill of said another singer; and means for comparing each music property with the reference data to evaluate the singing skill of said one singer and said another singer so that the singing skill of said one singer and said another singer can be scored individually and independently from one another while said one singing voice and said another singing voice are mixed to each other.

10. A method of accompanying a karaoke music on a singer according to music information, comprising the steps of:

providing the music information containing accompaniment data and at least first reference data and second reference data, respectively, corresponding to a first part and a second part of the karaoke music;

generating the karaoke music according to the accompaniment data while a first singer sings the first part along with the karaoke music and a second singer sings the second part along with the karaoke music;

collecting a first singing voice of the first singer and a second singing voice of the second singer during progression of the karaoke music;

extracting from the collected first singing voice a first music property characteristic to a singing skill of the first singer, and separately extracting from the second singing voice a second music property characteristic to a singing skill of the second singer; and comparing the first music property with the first reference data to evaluate the singing skill of the first singer, and comparing the second music property with the second reference data to evaluate the singing skill of the second singer so that the singing skill of the first singer and the singing skill of the second singer can be scored individually and independently from one another while the first singing voice and the second singing voice are mixed to each other.

11. A method according to claim 10, wherein the step of providing provides the music information of a duet karaoke music such that the first part is assigned to a main vocal part and the second part is assigned to a chorus vocal part, and wherein the step of comparing evaluates the singing skill of the first singer who sings the main vocal part and evaluates the singing skill of the second singer who sings the chorus vocal part jointly with the first singer.

12. A method according to claim 10, wherein the step of extracting extracts the first music property in terms of pitch, volume and rhythm of the first singing voice, and separately extracts the second music property in terms of pitch, volume and rhythm of the second singing voice.

13. A method according to claim 12, wherein the step of extracting secondarily extracts the rhythm of the first singing voice according to variation of the volume which is primarily extracted from the first singing voice, and secondarily extracts the rhythm of the second singing voice according to variation of the volume which is primarily extracted from the second singing voice.

14. A method according to claim 10, wherein the step of providing provides the first reference data based on a first guide melody contained in the karaoke music to guide the first part, and provides the second reference data based on a second guide melody contained in the karaoke music to guide the second part.

15. A method according to claim 10, wherein the step of extracting successively extracts samples of the first music property and samples of the second music property during the progression of the karaoke music, and wherein the step of comparing successively calculates a difference between each sample of the first music property and the first reference data and accumulates the calculated difference to obtain a first score point representative of the singing skill of the first singer, and successively calculates a difference between each sample of the second music property and the second reference data and accumulates the calculated difference to obtain a second score point representative of the singing skill of the second singer.

16. A machine readable media containing instructions for causing a karaoke machine to perform operation of accompanying a karaoke music on a singer according to music information, wherein the operation comprises the steps of:

providing the music information containing accompaniment data and at least first reference data and second reference data, respectively, corresponding to a first part and a second part of the karaoke music;

generating the karaoke music according to the accompaniment data while a first singer sings the first part along with the karaoke music and a second singer sings the second part along with the karaoke music;

collecting a first singing voice of the first singer and a second singing voice of the second singer during progression of the karaoke music;

extracting from the collected first singing voice a first music property characteristic to a singing skill of the first singer, and separately extracting from the second singing voice a second music property characteristic to a singing skill of the second singer; and comparing the first music property with the first reference data to evaluate the singing skill of the first singer, and comparing the second music property with the second reference data to evaluate the singing skill of the second singer so that the singing skill of the first singer and the second singer can be scored individually and independently from one another while the first singing voice and the second singing voice are mixed to each other.

17. A machine readable media according to claim 16, wherein the step of providing provides the music information of a duet karaoke music such that the first part is assigned to a main vocal part and the second part is assigned to a chorus vocal part, and wherein the step of comparing evaluates the singing skill of the first singer who sings the main vocal part and evaluates the singing skill of the second singer who sings the chorus vocal part jointly with the first singer.

18. A machine readable media according to claim 16, wherein the step of extracting extracts the first music property in terms of pitch, volume and rhythm of the first singing voice, and separately extracts the second music property in terms of pitch, volume and rhythm of the second singing voice.

19. A machine readable media according to claim 18, wherein the step of extracting secondarily extracts the rhythm of the first singing voice according to variation of the volume which is primarily extracted from the first singing voice, and secondarily extracts the rhythm of the second singing voice according to variation of the volume which is primarily extracted from the second singing voice.

20. A machine readable media according to claim 16, wherein the step of providing provides the first reference data based on a first guide melody contained in the karaoke music to guide the first part, and provides the second reference data based on a second guide melody contained in the karaoke music to guide the second part.

21. A machine readable media according to claim 16, wherein the step of extracting successively extracts samples of the first music property and samples of the second music property during the progression of the karaoke music, and wherein the step of comparing successively calculates a difference between each sample of the first music property and the first reference data and accumulates the calculated difference to obtain a first score point representative of the singing skill of the first singer, and successively calculates a difference between each sample of the second music property and the second reference data and accumulates the calculated difference to obtain a second score point representative of the singing skill of the second singer.

* * * * *